(12) United States Patent
Shimoji

(10) Patent No.: US 7,042,482 B2
(45) Date of Patent: May 9, 2006

(54) IMAGE PROCESSING APPARATUS, IMAGE PROCESSING METHOD, AND PROGRAM

(75) Inventor: Masaya Shimoji, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 93 days.

(21) Appl. No.: 10/762,825

(22) Filed: Jan. 21, 2004

(65) Prior Publication Data

US 2004/0150709 A1   Aug. 5, 2004

(30) Foreign Application Priority Data

Jan. 29, 2003   (JP) ............................. 2003-021024

(51) Int. Cl.
  *G03D 13/00*   (2006.01)
  *B41J 2/435*   (2006.01)
(52) U.S. Cl. ...................................... 347/236; 347/246
(58) Field of Classification Search ................ 347/228, 347/140
  See application file for complete search history.

(56) References Cited

U.S. PATENT DOCUMENTS

| 5,436,735 | A | | 7/1995 | Tanare et al. |
| 6,072,513 | A | * | 6/2000 | Agano ......................... 347/188 |
| 6,335,153 | B1 | * | 1/2002 | Toya ........................... 430/350 |
| 6,400,912 | B1 | | 6/2002 | Tanaka et al. |
| 6,784,911 | B1 | * | 8/2004 | Umeki et al. ................ 347/228 |
| 6,812,996 | B1 | * | 11/2004 | Horiuchi et al. .............. 355/35 |
| 6,956,639 | B1 | * | 10/2005 | Horiuchi et al. .............. 355/27 |
| 2002/0135788 | A1 | | 9/2002 | Arakawa et al. |
| 2003/0043257 | A1 | * | 3/2003 | Umeki et al. ................ 347/251 |
| 2003/0190558 | A1 | * | 10/2003 | Shiraishi et al. ............ 430/350 |
| 2004/0125200 | A1 | * | 7/2004 | Ono et al. .................... 347/253 |
| 2005/0046690 | A1 | * | 3/2005 | Umeki et al. ................ 347/221 |
| 2005/0099488 | A1 | * | 5/2005 | Umeki et al. ................ 347/221 |

FOREIGN PATENT DOCUMENTS

EP   1 217 430   6/2002

* cited by examiner

*Primary Examiner*—Huan Tran
(74) *Attorney, Agent, or Firm*—Frishauf, Holtz, Goodman & Chick, P.C.

(57) ABSTRACT

An image processing apparatus, comprising: an exposing device for exposing an image forming material so as to form a latent image on the image forming material based on image data; a thermal developing device for developing and visualizing the latent image on the exposed image forming material so as to form an image; a measuring device for measuring the image density of the image on the developed image forming material; a calibrating device for forming a table to define a relation between an image signal and image density on the basis of plural different test image data and measured-image densities thereof; a counting device for counting the number of the image forming material developed within predetermined time; and a controlling device for controlling the exposing device, the thermal developing device, the measuring device, the calibrating device and the counting device; wherein the controlling device stop forming the table for predetermined time when the counting device counts the number of the developed image forming material more than predetermined number.

27 Claims, 11 Drawing Sheets

DIRECTION OF CONVEYANCE

IMAGE PROCESSING APPARATUS, IMAGE PROCESSING METHOD, AND PROGRAM

FIELD OF THE INVENTION

This invention relates to a heat developing apparatus, a method of heat developing and its software programs, particularly relates to a heat developing apparatus, a method of heat developing and its software program to make a finishes film to have proper densities when forming medical diagnostic images on films.

BACKGROUND OF THE INVENTION

Since a medical laser imager is required to express a diagnostic image with tone reproduction, there is a strong demand for a basic function to output densities of the diagnostic image stably at any time. Further, there is a feature that the medical laser imager is used in many cases in such a way that a patient is continuously radiographed on several sheets or around four sheets as the maximum for the front and the sides of the chest or the front, the sides, the side anteflexion and the retorflexion when photographing and/or printing the lumbar vertebra.

These medical laser imagers are equipped with a so-called calibration function to control an image forming section in such a way that a digital or video signal (a designated density signal) is expressed with a predetermined density on a film.

Immediately after the calibration, the predetermined density is retained for a while, however, it fluctuates due to several factors as time passes after the calibration. Especially, it is well known that densities reproduced by a heat developing process fluctuate easily.

For example, there are the following factors for the fluctuation:

(1) Exposure system fluctuation due to an environmental temperature,
(2) Characteristic fluctuation of heat developing process associated with film development,
(3) Sensitivity fluctuation of film stored in a machine,
(4) Characteristic changes of a heat developing drum,
(5) Film which has different heat developing characteristics.

In the above fluctuation factors, since a degree of an influence on a density fluctuation due to the fluctuations described in factors (1) and (2) can be predicted to a certain extent by a monitor for the inside temperature of the machine, the finished density can be corrected so as to keep the predetermined density by a feed-forward control (FF). On the other hand, as it may be difficult to predict fluctuations described in factors (3)–(5), a so-called patch density feed-back method (FB) is used for these fluctuations in such a way that a finished patch density influenced with overall fluctuations including the fluctuations described in factors (3)–(5) is measured, and then a feed back (FB) correction is applied the following print based on the measured patch density.

In this patch density feed-back method, an about 5×10 mm rectangular area at a predetermined position on a film is exposed with a predetermined amount of light, the finished density of the area is measured, and then an exposure amount and/or a heat developing condition are adjusted so as to make the following print to have an optimum density on a basis of a difference between the measured density and a fundamentally-obtainable density (hereinafter, referred as a reference density).

Consequently, when the reference density is set incorrectly, even though a developing system reproduces proper images (proper density), an adjustment system judges that it is not proper and a process system changes a processing condition, as a result, density is lowered or increased.

It is undesirable to set a reference density at a constant value since an exposure system and a heat developing process include dispersion factors in an each individual apparatus.

There are a lot of cases that a combination of a calibration function and a patch density control is used in a medical laser imager to stabilize gradation and attain an absolute density.

Incidentally, since a surface-type heater is attached on an inner peripheral surface of a cylindrical aluminum element tube in a heat developing drum, a joint seam of a heating element (a portion where heating is not applied) is inevitably formed due to a manufacturing process and a temperature un-uniform portion inevitably exists in an circumferential direction. Depending on the situations, a joint seam takes place along a longitudinal direction on a heated drum. In order to make the drum surface temperature corresponding to the point where a heater is not provided, to be the same temperature as that of other places as far as possible, the heater attaching density (Watt distributing density) in the vicinity of the joint seam of the heater is set at relatively higher level on comparison with other places. With the heater control, it is necessary to compensate the quantity of heat in the amount taken away from the drum surface by a film when the film is conveyed and processed. Consequently, in general, a sensor is provided on the internal or external surface of the drum and the heater is controlled with ON/OFF control according to sensor output.

This ON/OFF control is activated even in the standby mode, waiting for film processing within which a drum temperature stays within a certain temperature fluctuation (hunting width is small even though there is hunting, for example, the drum temperature stays within 1° C. so that the influence on density is small. However, as the film processing continues, this hunting width becomes wider (more than 1.5° C.) and the influence on density becomes noticeable.

Furthermore, overshooting or undershooting appears based on timing of heater control when film processing is finished. For example, when a heater is turned on at the time when film processing is stopped, overshooting of the drum temperature results since control is in a mode, which supplies heat for continuous processing of film. Executing calibration in this situation results in abnormal density on the wedge-pattern portion developed by a drum surface corresponding to a seam whose temperature was abnormal. This abnormal temperature tends to appear on an area where heaters were superposed to avoid a joint seam between heated portions. When subsequently printing a diagnostic image by using a lookup table for calibration, appropriate direct tone-reproduction by density cannot be obtained since the lookup table was produced based on measurements of this abnormal density to cancel abnormal density itself, and adversely influences diagnostics.

SUMMARY OF THE INVENTION

Therefore, an objective of this invention is to provide a heat developing apparatus and a method of heat developing and related-software programs that enable proper tone reproduction by density as well as an image with stable density even though a heat developing drum heated with a surface type heater is used.

Another objective of this invention is described below.

The subject above is solved by each embodiment of this invention described below.

(Item 1)

A heat developing apparatus comprises:

an exposing means for forming an image as a latent image on a film based on calibration image data or diagnostic image data;

a heat developing means for developing and visualizing the image exposed by the exposing means by heating the film with a heater and conveying the film by a heating and conveying section;

a measuring means for measuring the density (optical density) of the developed film;

a calibrating means for forming an LUT (Look Up Table) so as to correlate diagnostic image data and light amount levels of the exposing means on a basis of the calibration image data and density measurement results of an image formed and processed based on the calibration image data;

a counting means for counting the number of sheets on which image formations are conducted within a certain period of time; and a control means for controlling each means described above;

wherein the control means prohibits the calibrating means to form a LUT by for a predetermined period of time when image formations are conducted for sheets more than the predetermined number of sheets for a predetermined period of time based on the counting means.

(Item 2)

A heat developing apparatus comprises:

an exposing means for forming an image as a latent image on a film based on calibration image data or diagnostic image data;

a heat developing means for developing and visualizing the image exposed by the exposing means by heating the film with a heater and conveying the film by a heating and conveying section;

a measuring means for measuring the density of the developed film;

a calibrating means for forming an LUT so as to correlate diagnostic image data and light amount levels of the exposing means on a basis of the calibration image data and density measurement results of an image formed and processed based on the calibration image data;

a temperature detecting means for detecting a heating drum temperature; and a control means for controlling each means described above;

wherein the control means prohibits the calibrating means to form a LUT when the detected temperature is not within a predetermined temperature range.

(Item 3)

A heat developing apparatus described in Item 1 or 2 further comprises:

a correcting means for correcting the exposing means and/or the developing means in such a way that when image formation is conducted based on the diagnostic image data on a film, a part of the film is exposed with a predetermined exposure amount or a exposure amount corresponding to a density designated through LUT, and a density of a film printed later on is optimized based on the measured density of the part of the film.

(Item 4)

A heat developing apparatus of 2 or 3, wherein the temperature detecting means is provided on the internal surface of the heating drum.

(Item 5)

A heat developing apparatus of Item 2 or 3, wherein the temperature detecting means is provided on the external surface of the heating drum.

(Item 6)

A heat developing method comprises:

an exposing step of forming an image as a latent image on a film based on calibration image data or diagnostic image data;

a heat developing step of developing and visualizing the image exposed by the exposing step by heating the film with a heater and conveying the film by a heating and conveying section;

a measuring step of measuring the density of the developed film;

a calibrating step of forming an LUT so as to correlate diagnostic image data and light amount levels of the exposing step on a basis of the calibration image data and density measurement results of an image formed and processed based on the calibration image data;

a counting step of counting the number of sheets on which image formations are conducted within a certain period of time; and a control step of controlling each step described above;

wherein the control step prohibits the calibrating step to form a LUT by for a predetermined period of time when image formations are conducted for sheets more than the predetermined number of sheets for a predetermined period of time based on the counting step.

(Item 7)

A heat developing method, comprises:

an exposing step of forming an image as a latent image on a film based on calibration image data or diagnostic image data;

a heat developing step of developing and visualizing the image exposed by the exposing step by heating the film with a heater and conveying the film by a heating and conveying section;

a measuring step of measuring the density of the developed film;

a calibrating step of forming an LUT so as to correlate diagnostic image data and light amount levels of the exposing step on a basis of the calibration image data and density measurement results of an image formed and processed based on the calibration image data;

a temperature detecting step of detecting a heating drum temperature; and a control step of controlling each step described above;

wherein the control step prohibits the calibrating step to form a LUT when the detected temperature is not within a predetermined temperature range.

(Item 8)

A heat-developing method described in Item 6 or 7 further comprises:

a correcting step of correcting the exposing step and/or the developing step in such a way that when image formation is conducted based on the diagnostic image data on a film, a part of the film is exposed with a predetermined exposure amount or a exposure amount corresponding to a density designated through LUT, and a density of a film printed later on is optimized based on the measured density of the part of the film.

(Item 9)
A software program enabling a computer to execute the heat developing method of any one of Items 6 to 8.

DETAILED DESCRIPTION OF THE PREFERRED EMBODIMENT

Embodiments of this invention will now be described in detail.

Figure 1:
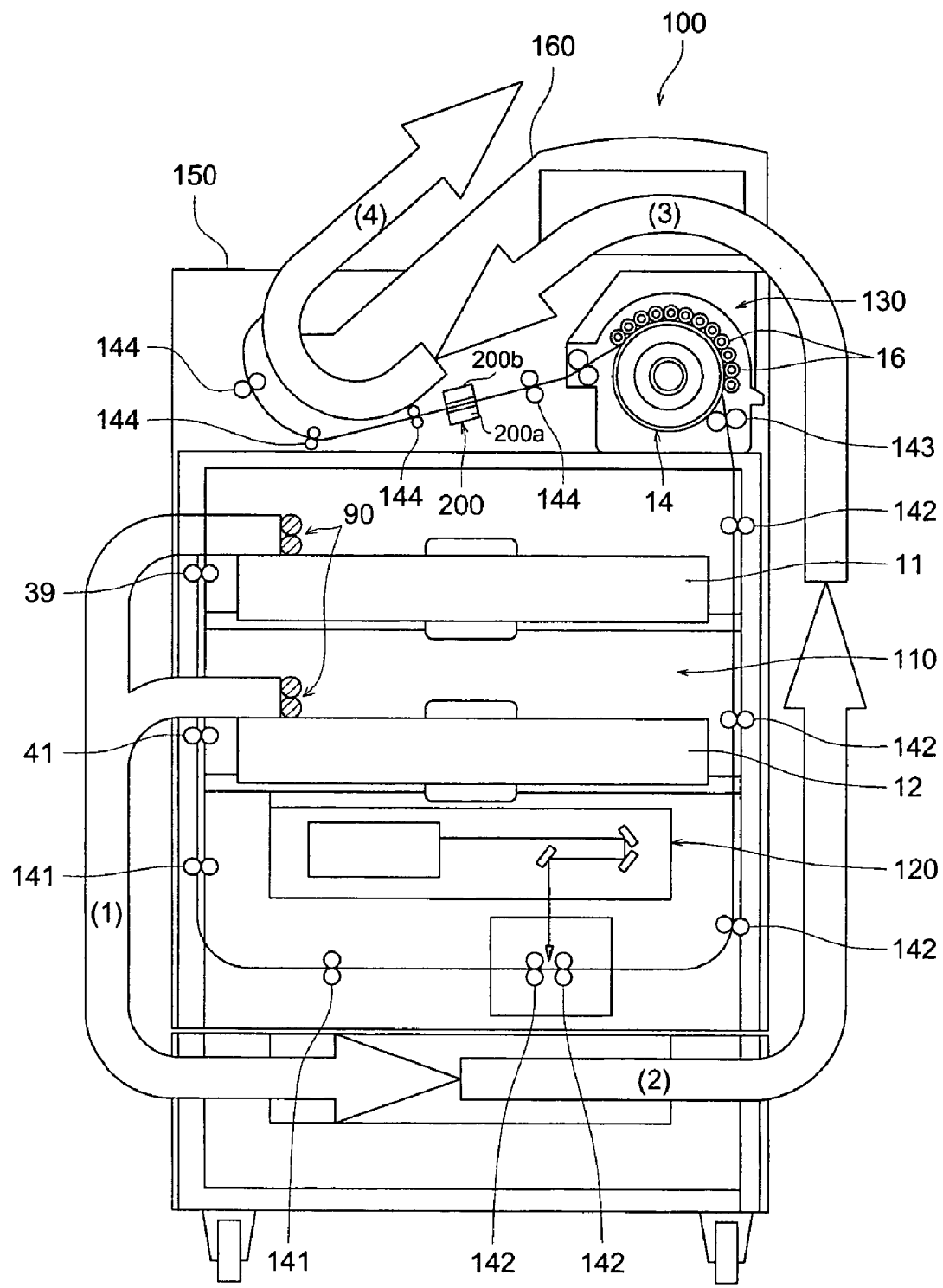
FIG. 1 is a main plan view of one of the configuration of the heat developing apparatus of this invention.
Figure 2:
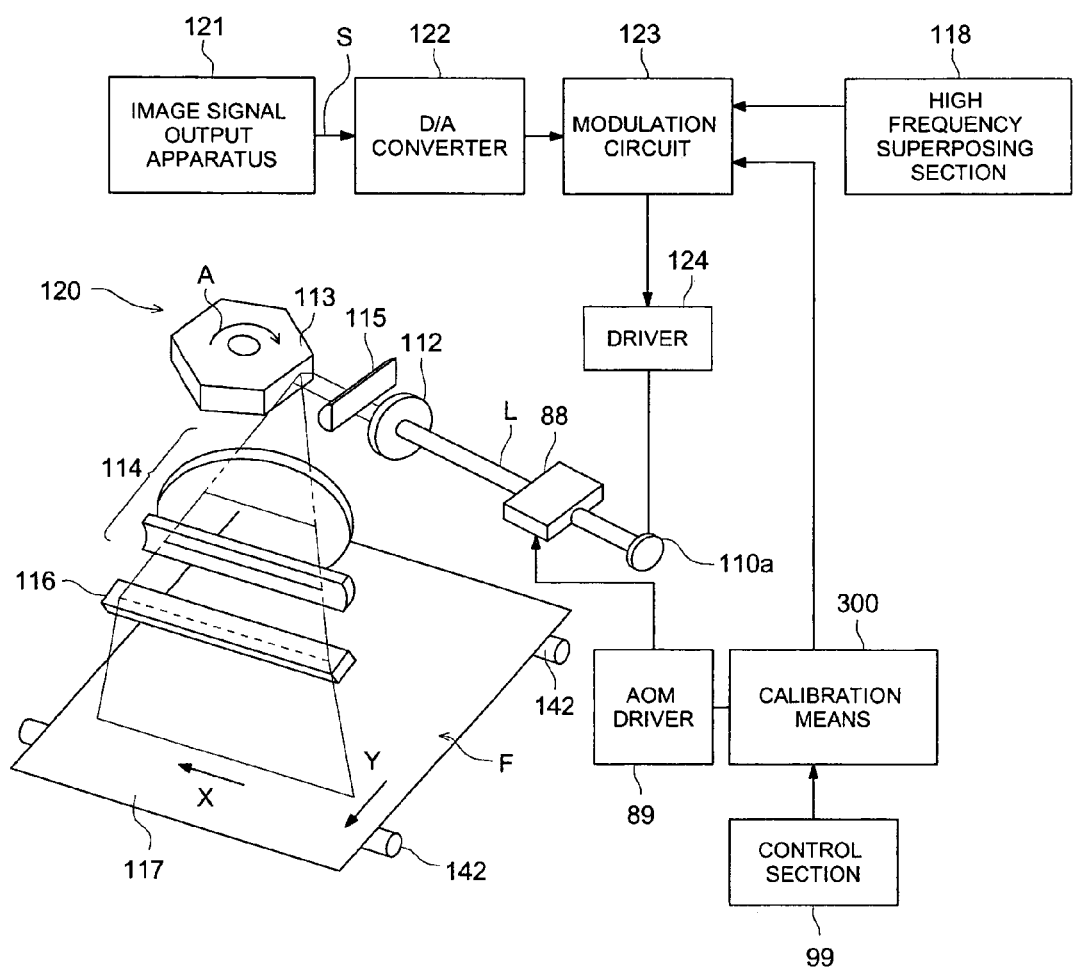
FIG. 2 is a schematic diagram of exposing section of heat developing apparatus shown in FIG. 1.
Figure 3:
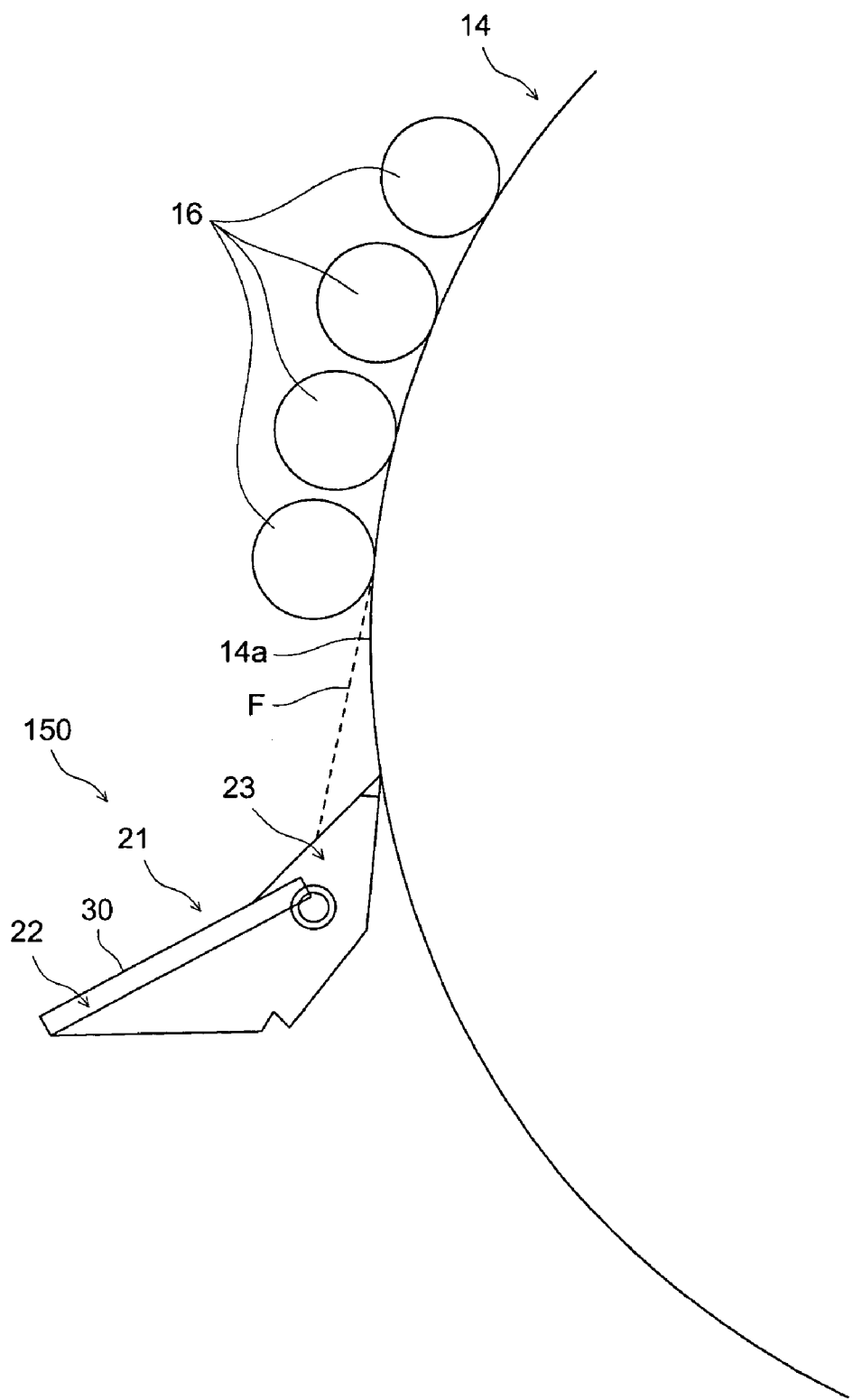
FIG. 3 is a main plan view of guiding material arranged in the vicinity of a thermal drum at the cooling and conveying section shown in FIG. 1.

FIG. 1 shows a front view of a main section of a heat developing apparatus embodied of this invention, FIG. 2 shows a block diagram of control unit of the heat developing apparatus shown in FIG. 1 and FIG. 3 shows a schematic diagram of the exposing section of the heat developing apparatus shown in FIG. 1.

The heat developing apparatus 100 shown in FIG. 1 is equipped with supply section 110 which includes first and second loading section 11 and 12 for loading a package in which films of sheet-shaped heat developable photosensitive material are packaged by the predetermined number of sheets, and supply unit 90 for conveying and supplying the film one sheet by one sheet for exposure and developing, exposure section 120 to expose film sheets supplied from supply section 110, developing section 130 (or heating conveying section 130) for developing thermally the film on which a latent image is formed, and densitometer 200 to measure the density of the developed film so as to obtain density information. The supply section 110 is designed to convey the film one sheet by one sheet from the first section 11 and the second loading section 12 in the arrowed direction (1) in FIG. 1 through supply section 90, paired conveying rollers 39, 41, and 141.

As shown in FIG. 2, heat developing apparatus 100 is equipped with control section 99 to control supply section 110, exposing section 120, developing section 130 and densitometer 200 etc., and control section 99 receives control signals from each section described above for control of the entire apparatus.

Exposing section 120 in heat developing apparatus 100 as shown in FIG. 2 is explained below. Exposing section 120 is designed to form a latent image on film F with a laser beam L whose wave length falls within a certain wavelength range from 780 nm–860 nm is modulated based on image signals S by deflecting the laser beam L with a rotating polygon 113 so as to conduct main-scanning on the film F, by simultaneously conducting sub-scanning by relatively moving the film to the laser beam L in an approximately horizontal direction which is approximately a direction perpendicular to the direction of the main-scanning.

The detail configuration of exposing section 120 is described as follows. As shown in FIG. 2, image signals S, being digital signal, is applied to D/A converter 122 and converted to analog signals. Then it is input to modulation circuit 123. Modulation circuit 123 controls laser driver 124 of laser beam source 110a and, enables laser source 110a to emit modulated laser beam L. In order to avoid forming interference fringes on the film, a high frequency component generated at high frequency superposed on section 118 is applied to a laser beam through modulation circuit 123 and driver 124.

Acoustic-optical modulator 88 is placed between exposing section 120 and lens 112. This acoustic-optical modulator 88 is controlled and driven by acoustic-optical modulator (AOM) driver 89 based on signals from correcting means 300. Correcting means 300 controls acoustic-optical modulator 88 through AOM driver 89 to optimize a modulation amount (a ratio of the outgoing beam amount to the incoming beam amount) during exposure, based on the correcting signals from control section 99.

Laser beam L emitted from laser source is optimally adjusted by acoustic-optical modulator 88 and after passing through lens 112, the laser beam is converged in only an upper or lower direction by a cylindrical lens. And the laser beam is incident on rotating polygon 113 as a line image perpendicular to the driving shaft of the rotating polygon. The rotating polygon 113 reflects and deflects laser beam L. The deflected laser beam passes through fθ lens 114 including a cylindrical lens comprising a combination of four lenses, thereafter is reflected by mirror 116 which is disposed primarily in the main scanning direction in the optical beam path, and scans repeatedly in the main scanning direction shown by arrow X the surface of film F 117 which is conveyed by conveying apparatus 142 in the direction is shown by arrow Y (being the sub-scanning direction).

Cylindrical lens in fθ lens 114 is positioned to focus incident laser beam L only in the sub-scanning direction on the scanned surface of film F, and the distance from the fθ lens to the scanning surface of film F equals to the total focusing distance summed up of all the lenses in fθ lens 114. In this way, cylindrical lens 115 and fθ lens 114 including cylindrical lens in exposing section 120, are positioned to focus on surface of the rotating polygon 113 once in the sub-scanning direction, in exposing section 120, whereby, even if surface fluttering and/or an axis run-out occurs, the scanning position of laser beam L never move in the sub-scanning direction. A rotating polygon provides excellent scanning stability comparing to a polarizing optical unit such as a galvanometer. Further as explained above, latent images are formed based on image signals S. The film sheet F, having a latent image formed on it is conveyed upward by a plurality of conveyance roller pairs 142 as shown by the arrow mark (2) in FIG. 1.

Next, heating and conveying section 130, and cooling and conveying section 150 in the heat developing apparatus shown in FIG. 1, will be explained. As shown in FIG. 3, a heating and conveying section 130, includes drum 14, which can be heated, onto which film F is secured on the outer circumference of drum 14, and plural rollers 16, between which a film is sandwiched and pressed on to drum 14. A drum 14 has a heater (not shown), which thermally develops film F conveyed by a plurality of roller pairs 143 by keeping the film F at a certain minimum heat development temperature (for example, approximately, 110° C.) for a certain period of heat developing time. By using the method described above, a latent image is formed so as to become a visible image on film F in exposing section 120. Control unit 99 shown in FIG. 2 controls the heater in drum 14, which is possible to adjust the density of film F by changing the development temperature.

Further, plural paired rollers 144 and cooling and conveying section 150, which is equipped with densitometer 200 and employed for cooling the film, are provided on the left side of heat developing section 130 in FIG. 1. Cooling and conveying section 150 cools film F which is conveyed downward on the left side down direction as shown by arrow (3) in FIG. 1. Densitometer 200 measures density of film F while plural paired conveying rollers 144 convey film F. After that, plural paired conveying rollers 144 further convey film F in the direction as shown in arrow (4) in FIG. 1, to be ejected from the upper portion of heat developing apparatus 100, where film F is ejected on to ejected tray 160 arranged at the upper right portion of heat developing apparatus 100.

FIG. 3 is the front view showing the essential part of a guide member 21 disposed in the neighborhood of the heating drum 14 in the cooling-conveyance section 150 shown in FIG. 1. As shown in FIG. 3, the guide member 21 is composed of a first member 22 which has a heat insulating property, makes up a guide surface 30 for guiding a film sheet F and is made of nonwoven fabric, and a second member 23 which has a heat conductive property, is made of a metal material such as aluminum and is provided at the lower surface of the first member 22 to form one body with the first member. After the film sheet F shown by the broken line of FIG. 3 is conveyed between the drum 14 and the guide rolls 16 and is separated from the outer circumferential surface 14a, the film sheet F first reaches the heat conducting second member 23 of the guide member 21 and subsequently is guided along the guide surface 30.

The densitometer 200 shown in FIG. 1 is equipped with a light emitting portion 200a and a light receiving portion 200b and has a function such that when a film sheet after development has been conveyed as described above and passes between the light emitting portion 200a and the light receiving portion 200b, a light beam emitted from the light emitting portion 200a is received through the film sheet by the light receiving portion 200b, and the density is measured on the basis of the degree of the decrement of the received light quantity.

Now, a heating conveying section 130 is described in detail.

Figure 4:
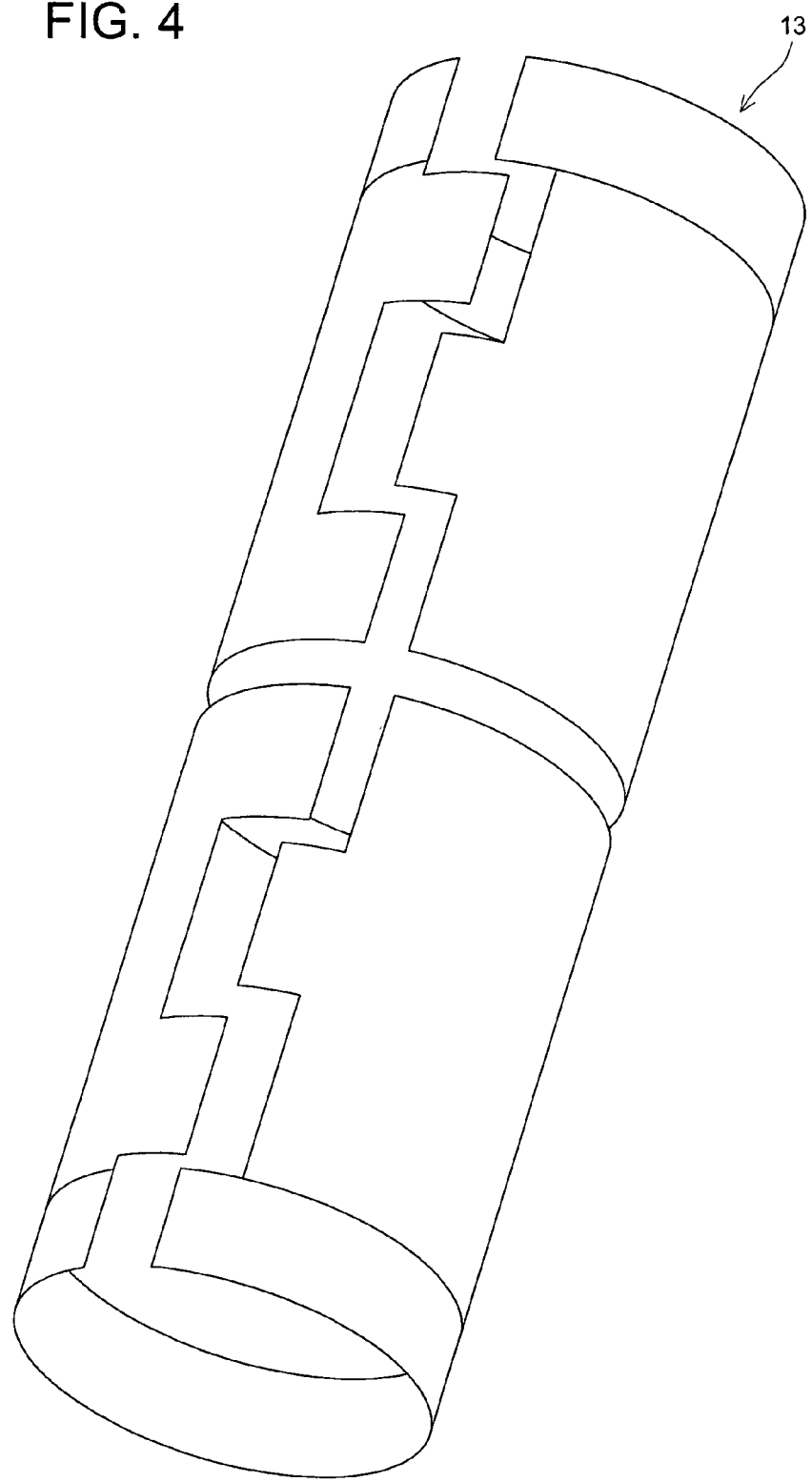
FIG. 4 is a schematic diagram to explain heating and conveying section of this invention.
Figure 5:
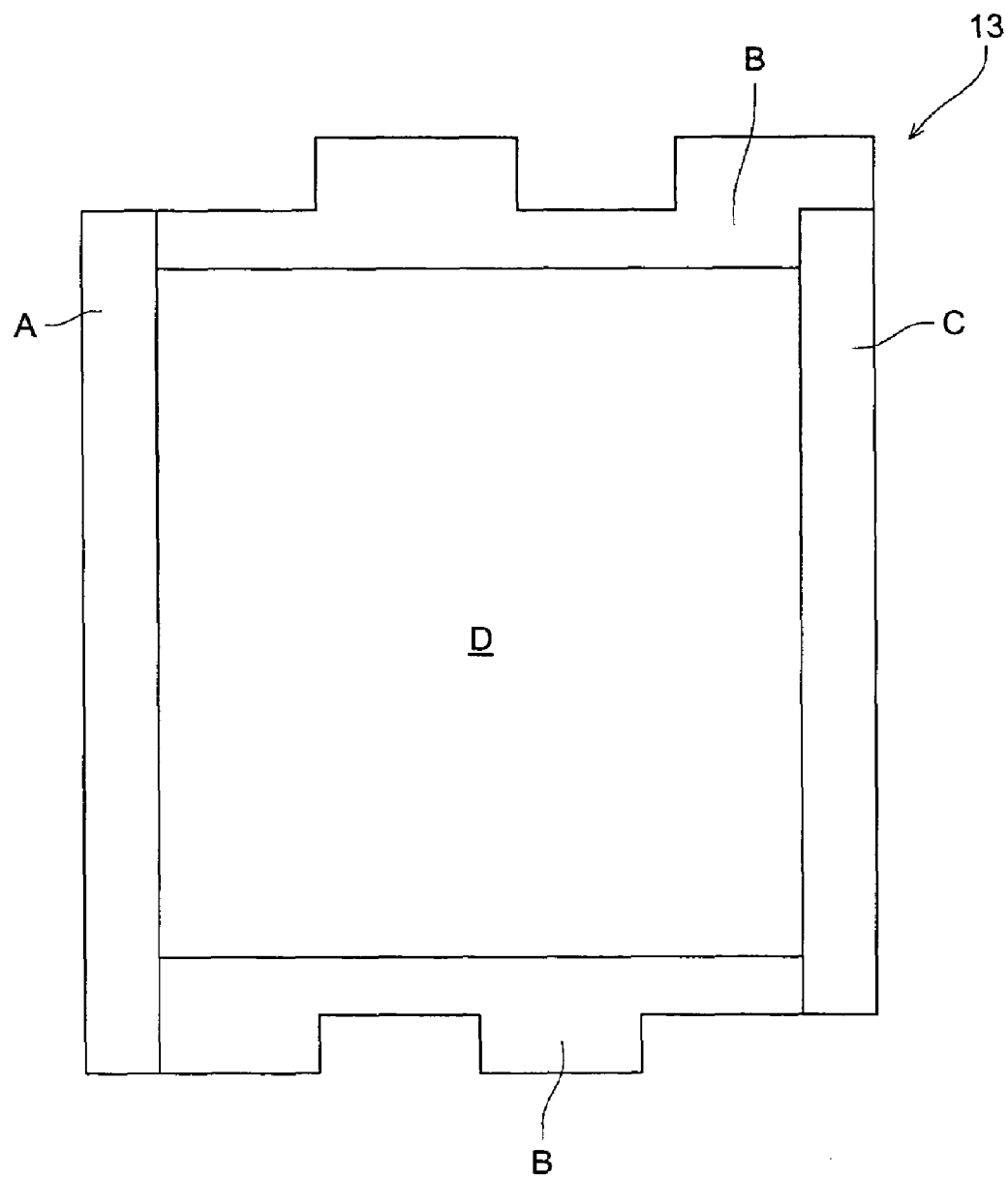
FIG. 5 is an expansion plan of a heater of heating and conveying section of this invention.

FIGS. 4 and 5 are provided to explain heating and conveying section 130.

As shown in FIG. 4, a heater is provided in cylindrical drum 14 (refer to FIG. 1) of heating and conveying section 130. It is favorable to change a heating density (Watt distributing density) at the end portions (joint portions) of heater 13. For example, as shown in FIG. 5, it is favorable that a heater is made of four sections such as A, B, C and D sections which are different in heating density such as A section>D section, B section>D section, C section>D section. Because, By changing the heating density, the temperature of drum 14 (refer to FIG. 1) can be stabilized, thereby improving development accuracy for the film.

Figure 6:
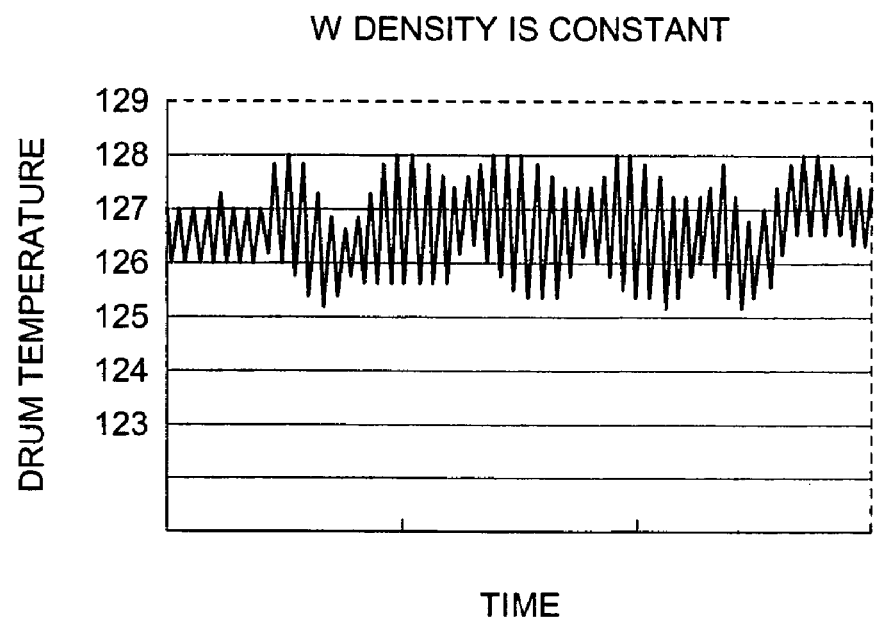
FIG. 6 is a drawing showing a drum temperature change when assuming that the temperature of a heater is constant and the same across the surface of the drum.
Figure 7:
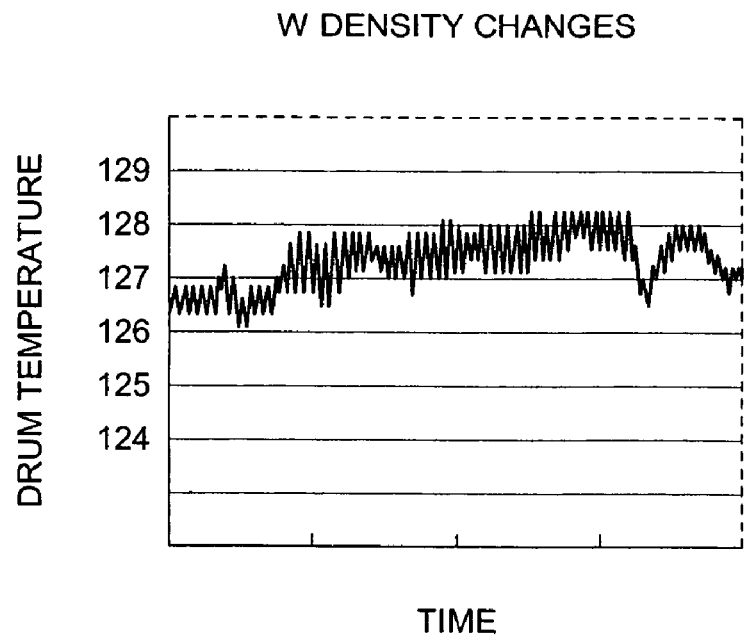
FIG. 7 is a drawing showing a drum temperature change when assuming that the temperature of heater is partially changed.

FIG. 6 shows a situation of fluctuation of drum temperature in the case when a surface temperature of the heater is controlled the same across the entire surface, and FIG. 7 shows a situation of fluctuation of drum temperature in the case when the surface temperature of the heater is adjusted locally.

The drum temperature as shown in FIG. 6 shows that the hunting width is wider (than that shown in FIG. 7) and not stabilized. On the other hand, the drum temperature as shown in FIG. 7 shows that the hunting width is less (than that of shown in FIG. 6). As showing above, drum temperature can be stabilized by changing the heating density of end portions of a heater.

Next, characterized functions of this invention will be explained with two embodiments by using the heat developing apparatus shown in FIG. 1. A software program (it will be called a program from now on) stored in a flash ROM etc. in advance in a heat developing apparatus, achieves these functions by it's control. The heat developing apparatus of this invention is provided with a microcomputer including a CPU (not shown) so as to execute the program to achieve the following functions.

First Embodiment

Figure 8:
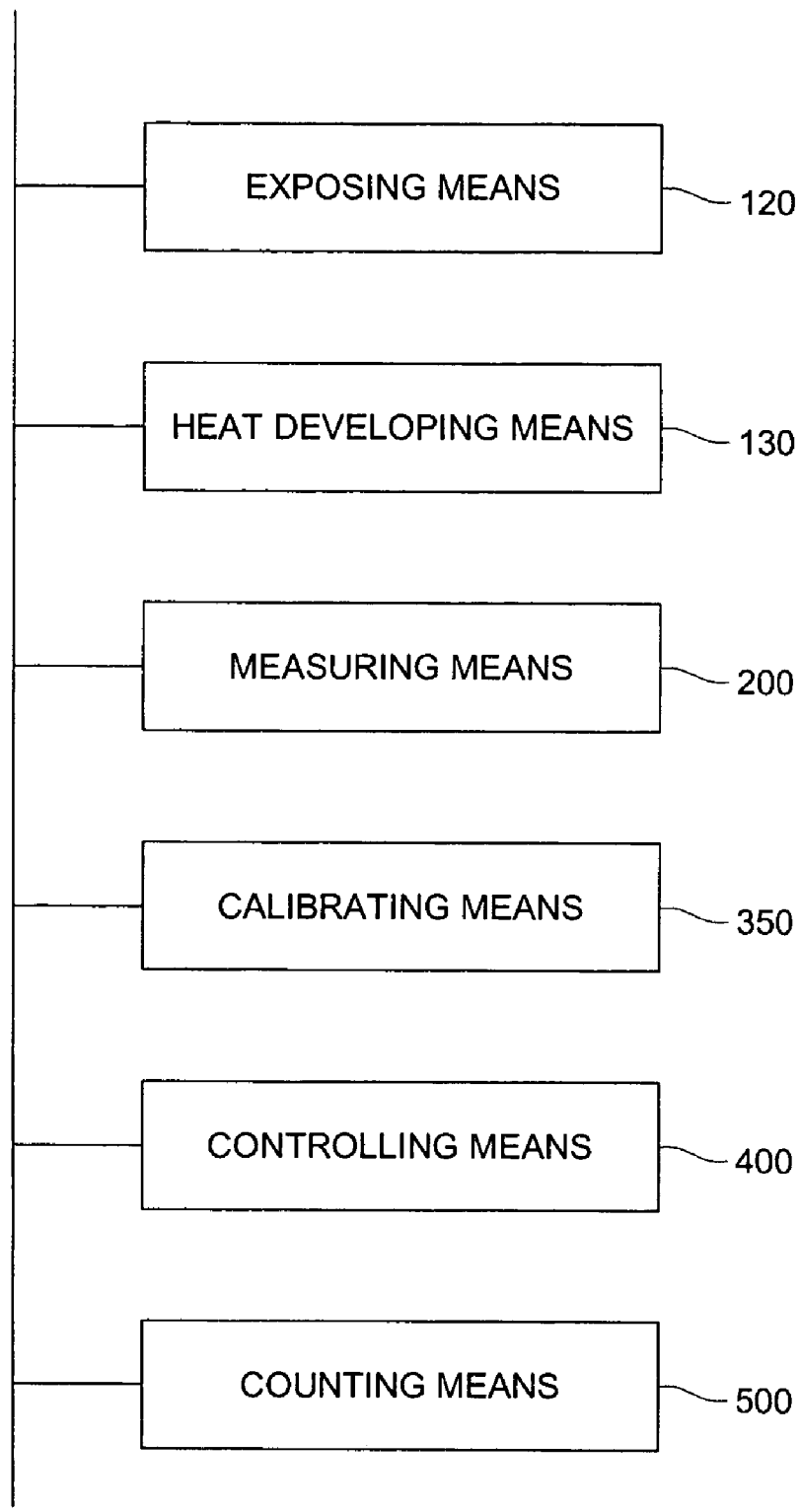
FIG. 8 is a block diagram explaining the first embodiment of a heat developing apparatus to effect the practice heat developing method of this invention.
Figure 9:
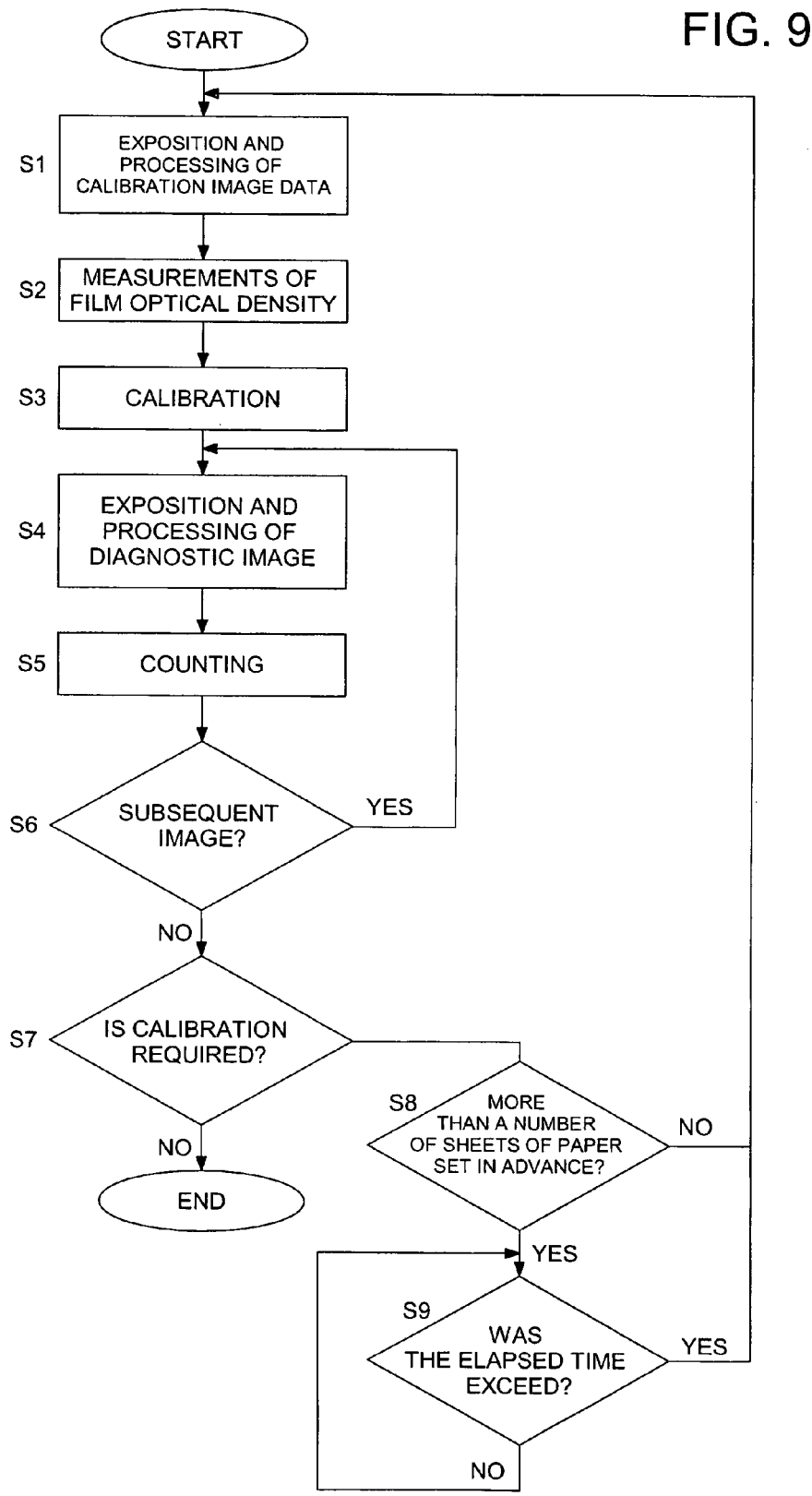
FIG. 9 is a flow chart to explain a process of heat developing apparatus shown in FIG. 8.

FIG. 8 is a block diagram to explain functions of the first embodiment of the heat developing apparatus to conduct the heat developing method on this invention, and FIG. 9 is a flow chart to explain the process of the heat developing apparatus shown in FIG. 8.

A heat developing apparatus as shown in FIG. 8 comprises an exposing means 120 for conducting an exposure process, heat developing means 130 for conducting a heat development process, a measuring means 200 for conducting a measuring process, a calibrating means 350 for conducting a calibration process, a control means 400 for conducting a control process and a counting means 500 for conducting a counting process.

As shown in FIG. 9, an exposure is effected based on calibration image data (or calibration image) in exposing means 120 and visualization is effected by heat developing means 130 (S1). In practice, a film is exposed on a basis of image data (calibration image data) different from diagnostic image and that the exposed image on the film is visualized in heating and conveying section 130 by heating and conveying process.

Then, the density of the film on which the calibration image is formed is measured by measuring means 200 (S2). The calibration image is an image which includes plural images exposed and developed based on image signals of various gradations. The measuring means 200 conducts density measurement so as to correspond measured densities to the calibration images.

Figure 10:
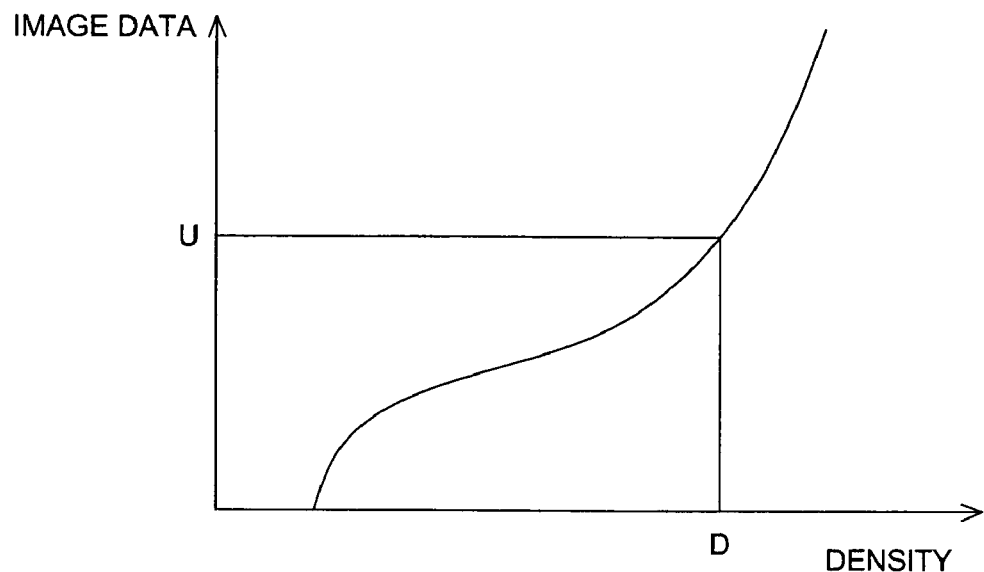
FIG. 10 is a graph showing an example of an LUT.

After measurement at S2, a LUT (Look Up Table), which correlates diagnostic image data with light amount levels of the exposing means is formed based on measured results of the calibrated images by calibration means 350 (S3). For example, an LUT is made in a graphic chart as shown FIG. 10 which correlates image data (density designating signals) with light amount levels.

Then, a film is exposed based on diagnostic image data (also called a diagnostic image) by the exposing means 200, and the exposed film is visualized in heat developing means 130 (S4).

Counting means 500 counts the elapsed time and simultaneously counts the number of sheets for each time that diagnostic image data are formed so that the counting means 500 counts the number of sheets on which image formation are conducted within a certain period of time. Although a timing to count the number of sheets by the counting means 500 is not limited to a specific timing, it is preferable to conduct the counting when the film is conveyed in heat developing section 130.

After counting in the counting means 500, it is judged to see if any diagnostic image data to be exposed next still exists (S6) and in case that a diagnostic image data still exists, the process is returned to the exposing and developing process (S4) for the diagnostic image data.

On the other hand, in the case that no diagnostic image data exists, then it is judged whether calibration in calibration means 350 is necessary (S7), and if it is necessary, then it is judged by referring to the counting means 500 whether the number of image formations has been conducted more the predetermined number of sheets within the predetermined time period (S8). In the case of judging that the number of image formations has been conducted more the predetermined number of sheets, then the calibration means 350 is prohibited to form a new LUT and waits until it is judged that a predetermined period of time has passed (S9). In the case of judging that the number of image formations has not been conducted more the predetermined number of sheets, then the flow returns to the S1 process.

For example, the predetermined number of sheets can be set to more than 20 sheets when the processing capability is more than 120 sheets/hour for the film having the sheet size of 345×430 mm. In general, when a hunting width of the temperature is more than 1° C., an influence on density starts to appear. In the above case, a hunting width of the temperature becomes approximately 1° C. when 20 sheets or more are subjected continuously to the image forming process. Also, when the processing speed is constant, a predetermined period of time with the maximum processing capacity can be used in place of the predetermined number of sheets. For example, in the case that the processing capability is more than 120 sheets/hour for the film having the sheet size of 345×430 mm, when the processing is conducted more than 10 minutes (60 minutes×20/120) with the maximum processing capacity, the calibration means 350 is prohibited calibrating an LUT (making a new LUT) for a prescribed period of time. As to the prescribed period of time, it is not limited to a specified period of time, but in the case of the example above, it is recommended that the calibration should be stopped after more than one minute.

According to the present invention, this invention provides a heat developing apparatus to obtain an image of stable density without a problem of the abnormal density due to a LUT which is formed by conducting calibration based on abnormal data, because an LUT is not be formed by conducting calibration based on images in the case of obtaining abnormal development results due to instability of the drum temperature which occurs on a heat developing device to conduct heat developing with a surface type heater.

Further, according to this invention, an embodiment having a correcting means that is not shown is also preferable.

Figure 11:
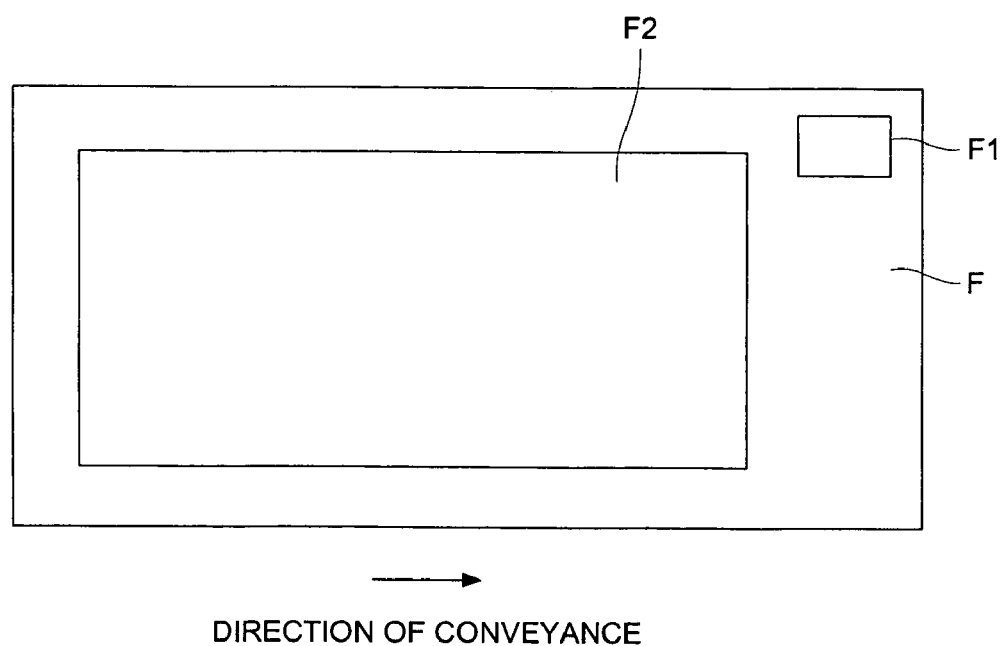
FIG. 11 is a drawing showing an image area of a film and a smaller part of that area.

When an image is formed based on diagnostic image data, a part of a film on which the diagnostic image is formed is exposed with a predetermined exposure amount or an exposure amount corresponding to a density designated through an LUT, then the correcting means corrects the exposing means and the developing means based on the measured density of that part of the film in order to optimize density of the film for subsequent print cycles. As a kind of F1 on a film F shown in FIG. 11, the part of the film on which the image is formed, is an area formed at an edge portion of an image forming region F2, for example, an area of about 5×10 mm is used for it. The measured density of that part of the film is called as patch data. More concretely, after a predetermined reference density value is set, the measuring means 200 measures the density of the part of the film which is exposed and developed based on the diagnostic image data. When the measured density is deviated from the reference density value, the correcting means conducts correction so as to eliminate the deviation between the measured density and the reference density value.

By conducting as described above, even when correction is conducted based on the patch data, since patch data is formed by using an LUT produced always from normal data, stable image characteristics can be always obtained.

Second Embodiment

Figure 12:
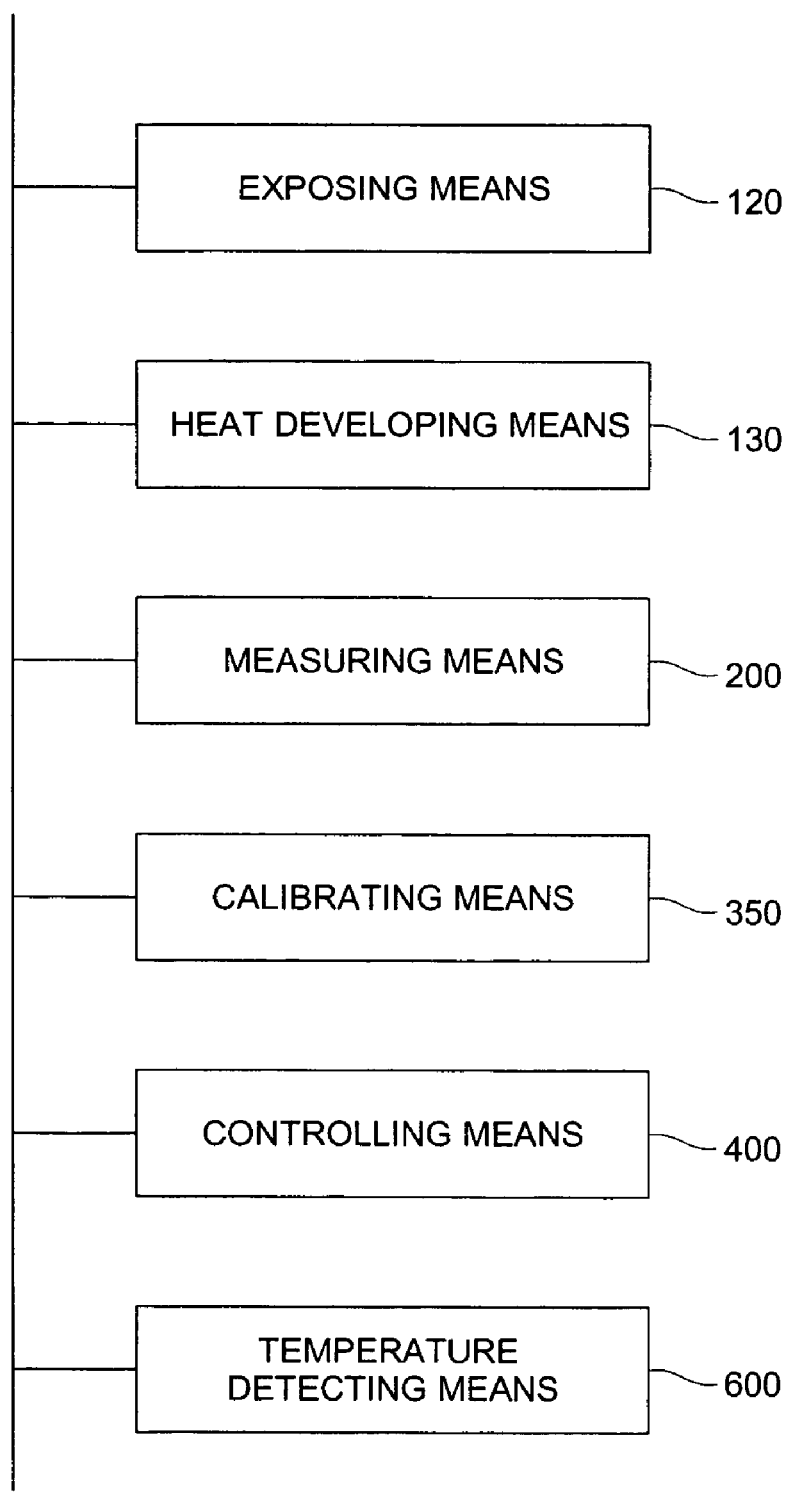
FIG. 12 is a block diagram to explain the second embodiment of a heat developing apparatus to practice a heat developing means of this invention
Figure 13:
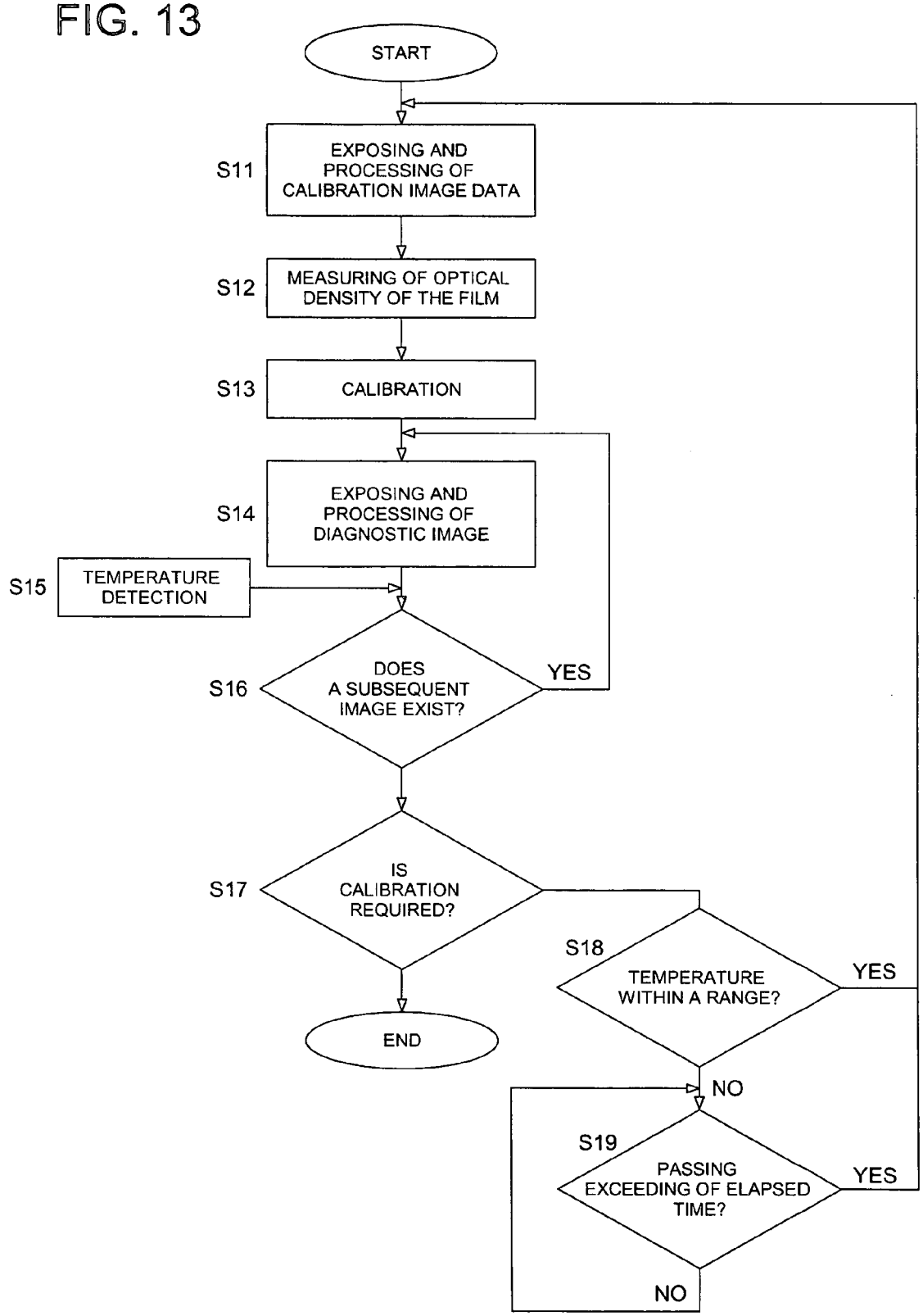
FIG. 13 is a flow chart explaining a process of heat developing apparatus shown in FIG. 12.

FIG. 12 is a block diagram explaining the second embodiment of the heat developing apparatus to implement the heat developing means of this invention, and FIG. 13 is a flow chart explaining the process of the heat developing apparatus shown in FIG. 12.

The heat developing apparatus of this invention, as shown in FIG. 12, comprises exposing means 120 to implement the exposing process, heat developing means 130 to implement heat developing process, measuring means 200 to implement measuring process, calibrating means to implement calibration process, control means 400 to implement control process and temperature detecting means 600 to implement temperature detecting process.

A significant feature of this invention is to prohibit calibration for a certain period of time, when the measured temperature of the heat developing means by the temperature detecting means does not fall within a certain temperature range.

As shown in FIG. 13, an exposure is implemented based on calibration image data (or calibration image) in exposing means 120, and heat developing means 130 visualizes the exposed image (S11). Especially, film is exposed based on a image data (calibration image data) which is different from diagnostic image data, then the exposed image is developed and visualized by heating and conveying the film with the heating and conveying section 130.

Then, the density of the film on which the calibration image has been formed is measured in measuring means 200 (S12). Calibration image is an image includes plural images exposed and developed based on image signals having various gradations. In the density measurement by the measuring means 200, densities of the plural images are measured so as to be correlated with the calibration image data.

After measuring densities of the film (S12), an LUT (Look Up Table) is made so as to correlate diagnostic image data with light amount levels of the exposing means based on the measured results of calibration images in measuring means 200 (S13).

Next, the film is exposed based on the diagnostic image data (also called diagnostic image) in exposing means 120, and the exposed images are developed and visualized at heat developing means 130 (S14).

Temperature detecting means 600 detects the temperature of heat developing means 130 whenever diagnostic image data is formed in heat developing means 130 (S15). Control parameters at heat developing means 130 can be changed based on these detected results.

It is beneficial to provide thermal detecting means 600 on an interior surface of the heating drum, from the viewpoint of avoiding scratches generated by touching the sensors etc., while film is in the developing process.

Further, it is beneficial to provide thermal detecting means 600 on an exterior surface on the heating drum, since temperature detection can be done more precisely due to direct temperature detection on an exterior surface of the drum, while the film is near the drum.

After temperature is detected in temperature detecting means 600, a judgment is made (S16) whether diagnostic image data to be exposed for the next exposure still exists. When diagnostic image data exists, then the process returns to an exposing and processing process (S14) for the diagnostic image data.

On the other hand, when no diagnostic data exists, then judgment is carried out (S17) if calibration is necessary in calibrating means 350. When calibration is necessary, then the temperature of detected results in detecting means 600 is checked to see if it falls within a prescribed range (S18). When it is judged that the temperature does not fall within the range, then calibration means 350 is prohibited to form an LUT and waits until it is judged (S19) that a prescribed period of time has elapsed. After the waiting, or it is judged (S18) that the temperature falls within the prescribed range, the process returns to the process at step S1.

When the calibrating means 350 is not prohibited to form an LUT, it is preferable that a hunting width of detected temperature and the temperature at the center of the hunting width (an average value of hunting width) fall within the temperature range under the standby mode (the condition before developing film). For example, when a temperature range during standby stays between 126° C. to 127° C., and if the hunting width and the temperature at the center of the hunting do not fall within 126° C. to 127° C., then the calibrating means 350 is prohibited to form an LUT.

In this embodiment, the correcting means as explained previously can also be arranged.

In addition to the effectiveness of the first embodiment, this invention can provide a heat developing apparatus having more stable image formation since abnormal data can be removed more surely by detecting temperature directly.

This invention also provides a heat developing apparatus and software programs, which can obtain proper direct-tone reproduction by density and images with stable density, even though using a surface heater heating the thermal drum.

What is claimed is:

1. An image processing apparatus, comprising:
    an exposing device for exposing an image forming material so as to form a latent image on the image forming material based on image data;
    a thermal developing device for developing and visualizing the latent image on the exposed image forming material so as to form an image;
    a measuring device for measuring an image density of the image on the developed image forming material;
    a calibrating device tor forming a table to define a relationship between an image signal and image density based on a plurality of different test image data and corresponding measured-image densities;
    a counting device for counting a number of the image forming materaials developed within a predetermined time; and
    a controlling device for controlling the exposing device, the thermal developing device, the measuring device, the calibrating device and the counting device;
    wherein the controlling device prevents formation of the table for a predetermined time when the number of the developed image forming materials counted by the counted device is more than a predetermined number.

2. The image processing apparatus of claim 1, wherein, when forming a diagnosis image, said exposing device exposes a part of the image forming material with a light quantity corresponding to a predetermined density based on the table;
    wherein a density is measured at said part of the image forming material; and
    wherein the controlling device controls at least one of the exposing device and the thermal developing device so as to optimize the density of the diagnosis image in accordance with the measured density of said part of the image forming material.

3. The image processing apparatus of claim 1, wherein the thermal developing device includes a heating drum that is heated by a heater so as to form the image.

4. The image processing apparatus of claim 3, wherein a surface of the heating drum includes an area that is not heated from a back of the area.

5. An image processing apparatus, comprising:
    an exposing device for exposing an image forming material so as to form a latent image on the image forming material based on image data;
    a thermal developing device for developing and visualizing the latent image on the exposed image forming material, wherein the developing device includes a heating drum which is heated by a heater so as to form an image;
    a measuring device for measuring an image density of the image on the developed image forming material;
    a calibrating device for forming a table to define a relationship between an image signal and image density based on a plurality of different test image data and corresponding measured-image densities;
    a thermal sensing device for sensing a temperature of a surface on the heating drum; and
    a controlling device for controlling the exposing device, the thermal developing device, the measuring device, the calibrating device and the thermal sensing device;
    wherein the controlling device prevents formation of the table when the temperature sensed by the thermal sensing device is outside of a predetermined temperature range.

6. The image processing apparatus of claim 5, wherein, when forming a diagnosis image, said exposing device exposes a part of the image forming material with a light quantity corresponding to a predetermined density based on the table;
    wherein a density is measured at said part of the image forming material; and
    wherein the controlling device controls at least one of the exposing device and the thermal developing device so as to optimize the density of the diagnosis image in accordance with the measured density of said part of the image forming material.

7. The image processing apparatus of claim 5, wherein the thermal sensing device is provided on an inner circumferential surface of the heating drum.

8. The image processing apparatus of claim 5, wherein the thermal sensing device is provided on an outer circumferential surface of the heating drum.

9. The image processing apparatus of claim 5, wherein the surface of the heating drum includes an area that is not heated from a back of the area.

10. An image processing method comprising:
    exposing an image forming material so as to form a latent image on the image forming material based on image data;
    developing and visualizing the latent image on the exposed image forming material with a thermal developing device so as to form an image;
    measuring an image density of the image on the developed image forming material;
    forming a table to define a relationship between an image signal and image density based on a plurality of different test image data and corresponding measured-image densities;
    counting a number of the image forming materials developed within a predetermined time; and
    preventing formation of the table for a predetermined time when the counted number of the developed image forming materials is more than a predetermined number.

11. The method of claim 10, wherein, when forming a diagnosis image, a part of the image forming material is exposed with a light quantity corresponding to a predetermined density based on the table;
    wherein a density is measured at said part of the image forming material; and
    wherein at least one of the exposing and the thermal developing device is controlled so as to optimize the density of the diagnosis image in accordance with the measured density of said part of the image forming material.

12. The method of claim 10, wherein the thermal developing device includes a heating drum that is heated by a heater so as to form the image.

13. The method of claim 10, wherein a surface of the heating drum includes an area that is not heated from a back of the area.

14. An image processing method comprising:
    exposing an image forming material so as to form a latent image on the image forming material based on image data;
    developing and visualizing the latent image on the exposed image forming material with a thermal developing device that includes a heating drum which is heated by a heater so as to form an image;
    measuring an image density of the image on the developed image forming material;
    forming a table to define a relationship between an image signal and image density based on a plurality of different test image data and corresponding measured-image densities;
    sensing a temperature of a surface on the heating drum with a thermal sensing device;
    preventing formation of the table when the temperature sensed by the temperature sensing device is outside of a predetermined temperature range.

15. The method of claim 14, wherein, when forming a diagnosis image, a part of the image forming material is exposed with a light quantity corresponding to a predetermined density based on the table;
    wherein a density is measured at said part of the image forming material; and
    wherein at least one of the exposing and the thermal developing device is controlled so as to optimize the density of the diagnosis image in accordance with the measured density of said part of the image forming material.

16. The method of claim 14, wherein the thermal sensing device is provided on an inner circumferential surface of the heating drum.

17. The method of claim 14, wherein the thermal sensing device is provided on an outer circumferential surface of the heating drum.

18. The method of claim 14, wherein the surface of the heating drum includes an area that is not heated from a back of the area.

19. A computer-readable storage medium having a computer program stored thereon that is executable by a computer to cause the computer to function as an image processor that performs functions comprising:
    an exposing function for exposing an image forming material so as to form a latent image on the image forming material based on image data;
    a thermal developing function for developing and visualizing the latent image on the exposed image forming material with a thermal developing device so as to form an image;
    a measuring function for measuring an image density of the image on the developed image forming material;
    a calibrating function for forming a table to define a relationship between an image signal and image density based on a plurality of different test image data and corresponding measured-image densities;
    a counting function for counting a number of the image forming materials developed within a predetermined time; and
    a controlling function preventing formation of the table for a predetermined time when the counted number of the developed image forming materials is more than a predetermined number.

20. The computer-readable storage medium of claim 19, wherein, when forming a diagnosis image, said exposing function exposes a part of the image forming material with a light quantity corresponding to a predetermined density based on the table;
    wherein a density is measured at said part of the image forming material; and
    wherein the controlling function controls at least one of the exposing and the thermal developing device so as to optimize the density of the diagnosis image in accordance with the measured density of said part of the image forming material.

21. The computer-readable storage medium of claim 19, wherein the thermal developing device includes a heating drum that is heated by a heater so as to form the image.

22. The computer-readable storage medium of claim 19, wherein a surface of the heating drum includes an area that is not heated from a back of the area.

23. A computer-readable storage medium having a computer program stored thereon that is executable by a computer to cause the computer to function as an image processor that performs functions comprising:
- an exposing function for exposing an image forming material so as to form a latent image on the image forming material based on image data;
- a thermal developing function for developing and visualizing the latent image on the exposed image forming material with a thermal developing device that includes a heating drum which is heated by a heater so as to form an image;
- a measuring function for measuring an image density of the image on the developed image forming material;
- a calibrating function for forming a table to define a relationship between an image signal and image density based on a plurality of different test image data and corresponding measured-image densities;
- a thermal sensing function for sensing a temperature of a surface on the heating drum with a thermal sensing device; and
- a controlling function preventing formation of the table when the the temperature sensed by the temperature sensing device is outside of a predetermined temperature range.

24. The computer-readable storage medium of claim 23, wherein, when forming a diagnosis image, said exposing function exposes a part of the image forming material with a light quantity corresponding to a predetermined density based on the table;
- wherein a density is measured at said part of the image forming material; and
- wherein the controlling function controls at least one of the exposing and the thermal developing device so as to optimize the density of the diagnosis image in accordance with the measured density of said part of the image forming material.

25. The computer-readable storage medium of claim 23, wherein the thermal sensing device is provided on an inner circumferential surface of the heating drum.

26. The computer-readable storage medium of claim 23, wherein the thermal sensing device is provided on an outer circumferential surface of the heating drum.

27. The computer-readable storage medium of claim 23, wherein the surface of the heating drum includes an area that is not heated from a back of the area.

* * * * *